(No Model.)

J. C. HAILE.
TWINE HOLDER.

No. 392,328. Patented Nov. 6, 1888.

WITNESSES.
Rich. George
Edwin H. Risley

INVENTOR.
John C. Haile.
By Risley, Love & Berry
Attys.

UNITED STATES PATENT OFFICE.

JOHN C. HAILE, OF UTICA, NEW YORK.

TWINE-HOLDER.

SPECIFICATION forming part of Letters Patent No. 392,328, dated November 6, 1888.

Application filed July 17, 1886. Serial No. 208,262. (No model.)

*To all whom it may concern:*

Be it known that I, JOHN C. HAILE, of Utica, in the county of Oneida and State of New York, have invented certain new and useful Improvements in Twine-Holders; and I do hereby declare that the following is a full, clear, and exact description of the invention, which will enable others skilled in the art to which it appertains to make and use the same, reference being had to the accompanying drawings, and to the letters of reference marked thereon, which form part of this specification.

The object of my invention is to provide a new and improved device for holding twine in such manner that the end of the twine will be raised as soon as the twine is cut or broken from the ball; and it consists in the mechanism hereinafter pointed out and claimed.

Figure 1:
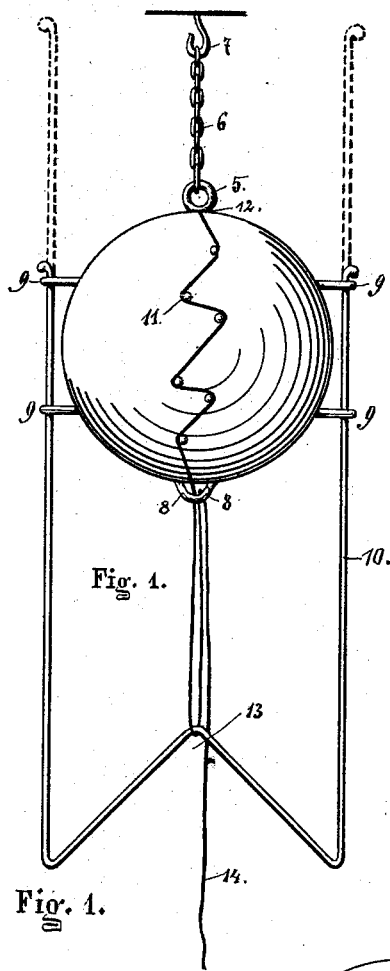
Figure 2:
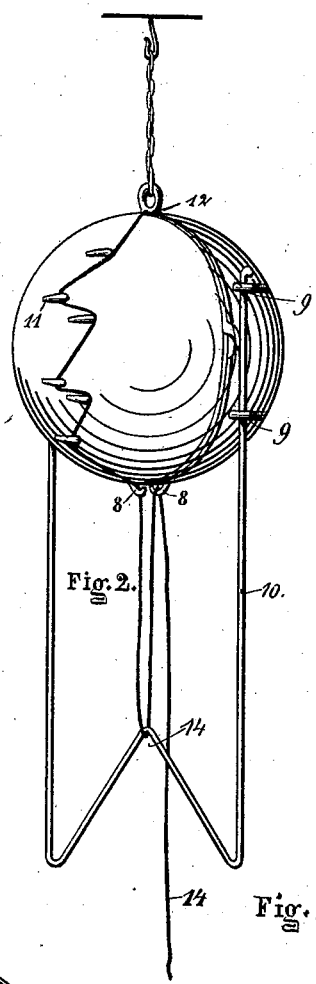
Figure 3:
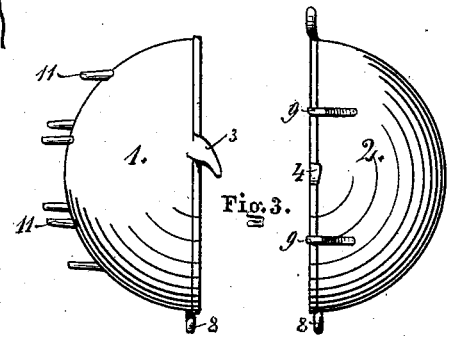

In the accompanying drawings, Figure 1 represents a side view of my improved twine-holder, the dotted lines indicating the vertical movement of the sliding take-up. Fig. 2 is a partial side view of the same. Fig. 3 represents an edge view of the two sections forming the twine-rack.

In the drawings similar letters of reference refer to corresponding parts throughout the several views.

An ordinary ball of wrapping-twine is placed between sections 1 and 2, Fig. 3, and inclosed by bringing the same together. On each side of section 1, Fig. 3, I provide downward-projecting lugs 3, which engage projecting flanges 4 upon the opposite sides of section 2, which is held in contact with section 1 by the downward-projecting lugs overlapping and riding projections 4 of the opposite section. The two sections are termed the "twine-rack," in which rack the ball is free to move when the twine is unwound. On the upper portion of section 2 I provide loop 5, Fig. 1, providing a convenient method of holding or suspending the twine-holder by means of chain 6, attached to hook 7, supported in the ceiling. Any other method of suspending the twine-holder may be used. At the bottom of sections 1 and 2, I provide guide eyes or loops 8 8 as a ready and convenient means of inserting and holding the twine when in use. On the outer edges of section 2 I provide four projecting guides, 9 9 9 9. Each guide is perforated to receive and move therein sliding take-up 10, which may be of any desired length and should move freely in the guides.

On the external surface of section 1 of the twine-rack I provide a series of friction devices consisting of projecting pins 11 11 11 11 11. These friction projections may be more or less numerous, according to the length and weight of the sliding take-up, and are provided on the surface of the rack for convenience in adjusting the twine and for producing a sufficient friction on the twine to overcome the weight of the sliding take-up.

The ball of twine is inserted between sections 1 and 2 of the twine-rack and the two sections united, as before stated. The end of the twine, passing through the rack at 12, is brought down and passed around the friction projections on the external surface of the rack, the end passed through the loops on the bottom of the two sections of the rack and under angle 13 in the sliding take-up, and is then passed through loops 8 at the bottom of the rack and the end brought down to reaching distance of the operator, as shown in Figs. 1 and 2. When the operator wishes to use the twine, he takes hold of end 14, draws down on the same, which motion moves the sliding take-up upward, as indicated in dotted lines of Fig. 1, when the operator can continue to draw from the ball the quantity of twine which he wishes, and when the twine is severed the sliding take-up instantly moves downward into the position shown in Figs. 1 and 2. This movement is produced by gravity. The extended end of the twine is moved upward at least twice the distance of the movement of the sliding take-up, it being quite obvious that the twine may be passed two or more times between loops 8 and angle 13 in the take-up, and thereby increase the take-up of the end of the twine.

Various modifications, which will readily suggest themselves, may be made without departing from the principle or spirit of my invention.

What I claim as new, and desire to secure by Letters Patent, is—

The combination, in a twine-holder, of the take-up consisting of a vertically-moving frame moving in guides or ears upon opposite sides of the twine-holder, friction-pins on the outer surface of the twine-holder for preventing the easy passage of the twine from the ball, and guide-eyes for directing and holding the twine in engagement with the friction-pins.

In witness whereof I have affixed my signature in presence of two witnesses.

JOHN C. HAILE.

Witnesses:
 EDWIN H. RISLEY,
 D. McGUCKEN.